(12) United States Patent
Lee et al.

(45) Date of Patent:

(10) Patent No.: US 8,766,952 B2
(45) Date of Patent: Jul. 1, 2014

(54) METHOD AND APPARATUS FOR USER INTERACTION USING PATTERN IMAGE

(75) Inventors: Dong Woo Lee, Daejeon (KR); Sungyong Shin, Daejeon (KR); Jeong Mook Lim, Daejeon (KR); Hee Sook Shin, Daejeon (KR); Hyun Tae Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 237 days.

(21) Appl. No.: 13/335,228

(22) Filed: Dec. 22, 2011

(65) Prior Publication Data

US 2012/0162140 A1    Jun. 28, 2012

(30) Foreign Application Priority Data

Dec. 23, 2010  (KR) .................... 10-2010-0133143

(51) Int. Cl.
    *G06F 3/042*  (2006.01)
(52) U.S. Cl.
    USPC ........................................... 345/175
(58) Field of Classification Search
    None
    See application file for complete search history.

(56) References Cited

U.S. PATENT DOCUMENTS

| 7,599,561 | B2  |    | 10/2009 | Wilson et al. |         |
|-----------|-----|----|---------|---------------|---------|
| 8,508,505 | B2  | *  | 8/2013  | Shin et al.   | 345/175 |
| 2003/0021032 | A1 | * | 1/2003 | Bamji et al.  | 359/568 |
| 2005/0168448 | A1 |   | 8/2005 | Simpson       |         |
| 2007/0249396 | A1 |   | 10/2007| Nitta et al.  |         |
| 2009/0115721 | A1 |   | 5/2009 | Aull et al.   |         |
| 2010/0103330 | A1 | * | 4/2010 | Morrison et al.| 348/744|
| 2011/0018897 | A1 | * | 1/2011 | Uchiyama et al.| 345/619|
| 2011/0242053 | A1 | * | 10/2011| Chiu          | 345/175 |

FOREIGN PATENT DOCUMENTS

WO    2006033245 A1    3/2006

OTHER PUBLICATIONS

Yoonjong Jin et al., Intelligent Projection System Using IR Marker and Complementary Patterns, Institute of Electronics Engineers of Korea, Nov. 2006, pp. 870-873, vol. 29, No. 2.
Patrick De La Hamette et al., Laser Triangulation as a means of robust Visual Input for Wearable Computers, ISWC, Oct. 2004.

* cited by examiner

*Primary Examiner* — Jason Olson
(74) *Attorney, Agent, or Firm* — William Park & Associates Patent Ltd.

(57) ABSTRACT

A user interaction apparatus using a pattern image includes: an image output unit for outputting a general image on a display region; a laser radiating unit for radiating laser beams for a pattern image; a pattern image forming unit for forming the pattern image by using the laser beams; a pattern image output unit for outputting the pattern image by overlapping the same on the display region of the general image; and an image acquiring unit for capturing the pattern image output on the display region. The apparatus further includes: an image recognizing unit for recognizing a user input by performing an image processing on the pattern image captured by the image acquiring unit.

14 Claims, 4 Drawing Sheets

METHOD AND APPARATUS FOR USER INTERACTION USING PATTERN IMAGE

CROSS-REFERENCE(S) TO RELATED APPLICATION(S)

The present invention claims priority of Korean Patent Application No. 10-2010-0133143, filed on Dec. 23, 2010, which is incorporated herein by reference.

FIELD OF THE INVENTION

The present invention relates to a method and apparatus for a user interaction using a structured light, and more particularly, a method and apparatus for a user interaction using an image of a pattern that is generated using laser and diffraction gratings, which are capable of recognizing a user input through an interaction with the user in a computer system or the like equipped with a projector and a camera.

BACKGROUND OF THE INVENTION

As technique is developed in recent years, projectors and cameras are reduced in size and equipped in mobile devices; therefore, they become more useful.

Further, a small projector or camera is produced in a wearable form to be put around a neck or shoulder, and being developed in a prototype for provision of various services. Also, a system of a portable type is being developed.

A conventional wearable projection computer, a conventional stand-type projection computer or the like is an example of a projection computer system which is equipped with an output device such as a projector, an input device such as a camera, and the like.

For interaction between such projection computer and a user, it is very important to sense and recognize a user input on a projected image.

For efficient interaction in a mobile environment, an effective method, in which an image is projected on a palm or table and a finger of a bare-hand is used for interaction, is applied. In order to perform such method in a mobile-embedded system, a low computational recognition technique is required.

According to the prior art, for increasing a recognition performance of interaction through a user's posture recognition, an interaction recognition improving unit, such as a color marker or the like, was physically worn around user's hand or finger, which caused inconvenience in the aspect that the user should hold the interaction recognition improving unit all the time.

To overcome such inconvenience, a bare-hand interaction technology is being developed, but a natural image captured by a camera is image-processed to recognize a user input. In this case, in order to identify the user input on the natural image, a high-level computation is required and thus an interaction processing takes a long time. Also, an embedded system or the like is unable to provide a fast response time. Especially, an operation of touching a surface, such as a palm or a table, using a bare finger, is a very difficult technique requiring a large computational amount.

Further, for providing services with better qualities by using a projector, appropriately adjusted brightness, color, focus and the like of an output image should be provided and no distortion should generates. To this end, the brightness, color, focus and the like of the projector needs to be adjusted, and an output screen should accurately match on a specific space. Thus, this related art also requires the high-level computation for such adjustment and matching, thereby spending a long-term of time for the adjustment and matching.

SUMMARY OF THE INVENTION

In view of the above, the present invention provides a method and apparatus for a user interaction, which are capable of reducing an interaction processing time by virtue of a low computation with respect to a captured image with allowing for a user interaction with a bare hand, and quickly executing an interaction between an output image and the user in a low computational form by quickly executing correction and matching of the output image in a dynamic manner.

In accordance with an aspect of the present invention, there is provided a user interaction apparatus using a pattern image. The apparatus includes: an image output unit for outputting a general image on a display region; a laser radiating unit for radiating laser beams for a pattern image; a pattern image forming unit for forming the pattern image by using the laser beams; a pattern image output unit for outputting the pattern image by overlapping the same on the display region of the general image; an image acquiring unit for capturing the pattern image output on the display region; and an image recognizing unit for recognizing a user input by performing an image processing on the pattern image captured by the image acquiring unit.

In accordance with another aspect of the present invention, there is provided a user interaction method using a pattern image. The method includes: outputting a pattern image formed by using laser beams by overlapping the same on a display region of a general image; capturing the pattern image output on the display region; and recognizing a user input by performing an image processing on the captured pattern image.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
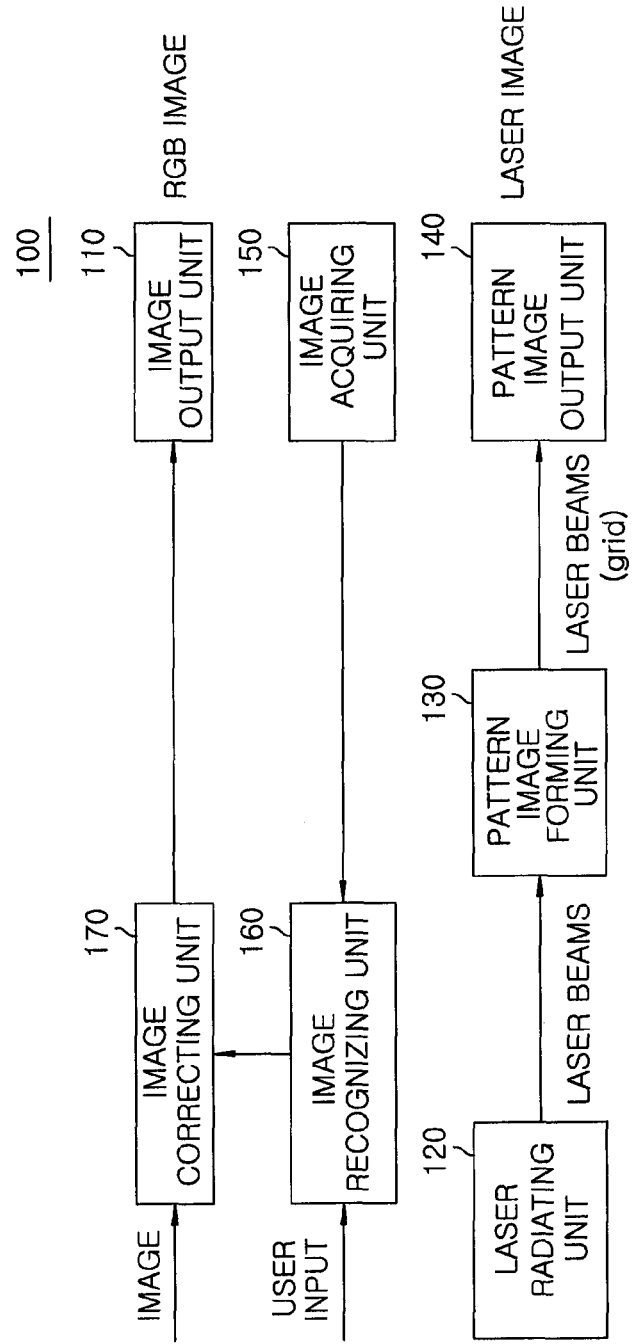
FIG. 1 illustrates a block diagram of a user interaction apparatus using a pattern image which has been generated by laser and diffraction gratings in accordance with an embodiment of the present invention.

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

Hereinafter, an embodiment of the present invention will be described in detail with the accompanying drawings which form a part hereof.

FIG. 1 is a block diagram illustrating the configuration of a user interaction apparatus using a pattern image which has been generated by laser and diffraction gratings in accordance with the embodiment of the present invention.

As illustrated in FIG. 1, the user interaction apparatus 100 may include an image output unit 110, a laser radiating unit 120, a pattern image forming unit 130, a pattern image output unit 140, an image acquiring unit 150, an image recognizing unit 160, an image correcting unit 170 and the like.

The image output unit 110 outputs a general RGB image on a display region. For example, the image output unit 110 may be implemented as a projector, which enlarges an input image and projects the enlarged image onto a display region, such as a palm, a table, a screen or the like.

The laser radiating unit 120 radiates laser beams for a pattern image. For example, the laser radiating unit 120 may be implemented as infrared rays generator for radiating infrared laser beams.

The pattern image forming unit 130 forms a pattern image by using the laser beams. For example, the pattern image forming unit 130 includes at least one of the diffraction gratings for forming a specific pattern image by diffracting laser beams, in which the pattern image may be formed in a grid, lines, dots or the like; however, it is not limited to those exemplified patterns.

The pattern image output unit 140 outputs the pattern image by overlapping the same on the display region of the general image. For example, the pattern image output unit 140 may insert a pattern image frame between general image frames at preset regular intervals.

The image acquiring unit 150 captures the pattern image output on the display region. For example, the image acquiring unit 150 is implemented as an infrared camera for capturing an infrared pattern image. When the pattern image output unit 140 outputs the pattern image frame for the preset period of time at the preset regular intervals, the image acquiring unit 150 captures the pattern image frame at the preset regular intervals.

The image recognizing unit 160 recognizes a user input by performing an image processing on the pattern image captured by the image acquiring unit 150, and additionally recognizes at least one or all of a focus state, a distortion state and the like.

When the image recognizing unit 160 recognizes the focus status or the distortion status of the pattern image captured by the image acquiring unit 150, the image correcting unit 170 corrects the focus status or the distortion status of an output image of the image output unit 110 based on the recognized state.

Figure 2A:
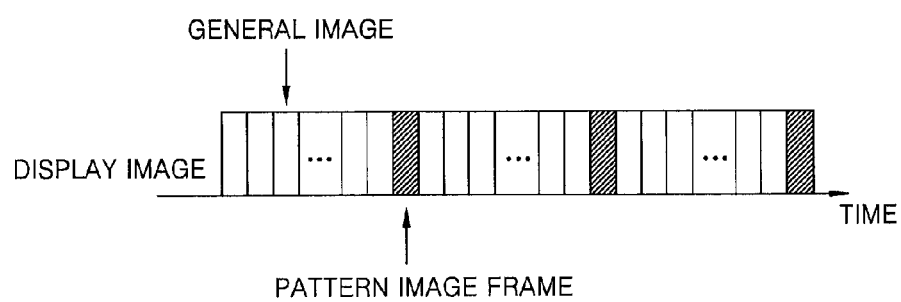
FIGS. 2A and 2B are views respectively illustrating an inserted state and a captured state of a pattern image which has been generated by a laser and diffraction gratings in accordance with the embodiment of the present invention.
Figure 2B:
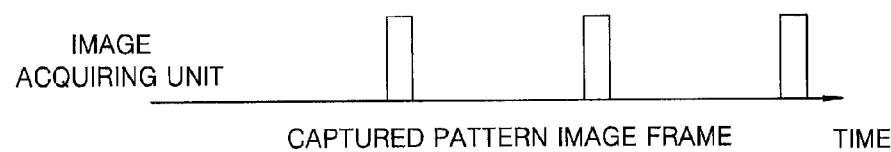

FIGS. 2A and 2B are views illustrating an inserted state and a captured state of a pattern image in accordance with an embodiment of the present invention.

Referring to FIG. 2A, a pattern image frame is inserted between general image frames at the preset regular intervals. In this case, the image acquiring unit 150 captures the pattern image frame at the preset regular intervals. Especially, the pattern image frame should be invisible to user's eyes for the quality of an output screen, and thus, there is a limitation on the number of pattern image frames which are able to be inserted per unit time. When it is intended to insert many pattern image frames in order to enhance the quality of recognizing a user's input, a high-speed pattern image insertion and a high-speed screen capture are required. Meanwhile, referring to FIG. 2B, in case of using an infrared pattern image, when an image is captured by an infrared camera, only a pattern image may be acquired. Thus, an image processing can be further facilitated and the pattern image may be invisible to the user, which may reduce limitation on the number of pattern image frames being inserted per unit time.

Figure 3:
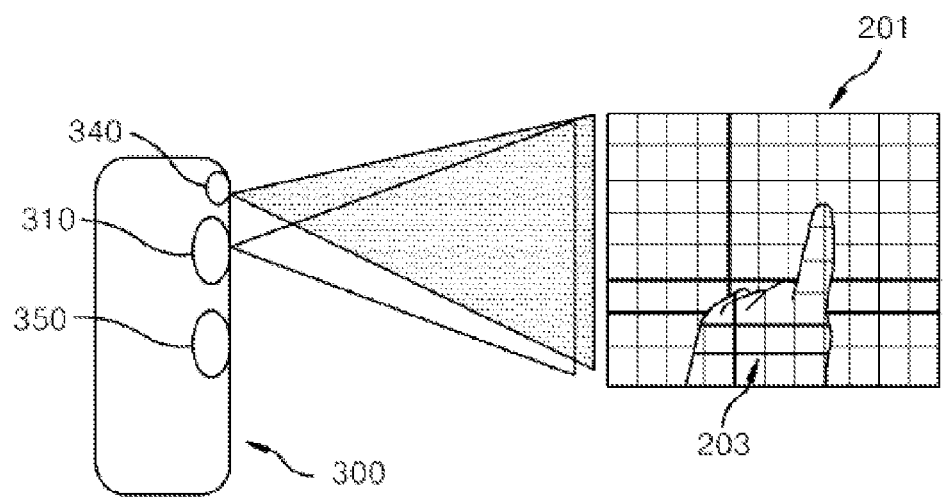
FIG. 3 is a view illustrating a projector/camera-integrated projection computer and a pattern image in accordance with the embodiment of the present invention.

FIG. 3 is an exemplary view illustrating a projector/camera-integrated projection computer and a pattern image in accordance with the embodiment of the present invention.

Referring to FIG. 3, as the pattern image, a grid image 201 is used. When a user touches a surface, such as a palm, a table, a screen or the like with a finger 203, the finger 203 and the surface may be positioned on a nearly same plane. Accordingly, the image recognizing unit 160 may recognize that the change of, e.g., distortion, brightness, thickness or the like in the pattern image hardly occurs. When the user does not touch the surface with the finger 203, the image recognizing unit 160 may recognize that the change in the pattern image is caused due to a distance difference between the finger 203 and the surface. Herein, the change in the pattern image may be used to detect and trace a movement of a hand and a fingertip.

In FIG. 3, it is illustrated that a projection computer 300 includes a projector 310 as an example of the image output unit 110, an optical lens 340 belonging to the pattern image output unit 140, and a camera as an example of the image acquiring unit 150. Here, in the present embodiment of the present invention, the pattern image output unit 140 includes the optical lens 340, but the optical lens 340 may be omitted. That is, when the pattern image output unit 140 installed inside outputs a pattern image with a desired size, there is no need to separately enlarge or output the pattern image, so the optical lens 340 may be omitted.

Figure 4A:
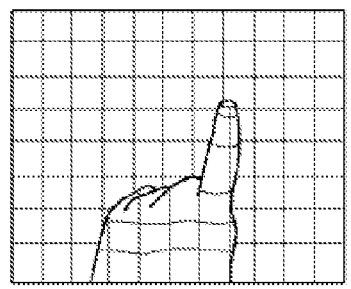
FIGS. 4A and 4B are views illustrating changed shapes of a finger touch operation and a finger non-touch operation, as an example of a pattern image frame captured by the user interaction apparatus in accordance with the embodiment of the present invention.
Figure 4B:
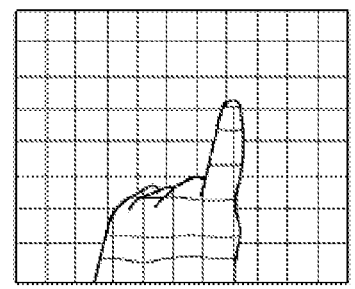

FIGS. 4A and 4B illustrates changed shapes of a finger touch operation and a finger non-touch operation, as an example of a pattern image frame captured by a user interaction apparatus using a pattern image in accordance with the embodiment of the present invention.

In the drawing, FIG. 4A shows an image captured by the image acquiring unit 150 when the finger touch operation is performed, and FIG. 4B shows an image captured by the image acquiring unit 150 when no finger touch operation is performed. When the user touches a surface, such as a palm or a table, with a finger, the finger and the surface may be almost flush with each other. Accordingly, when the image recognizing unit 160 extracts a pattern image, the change (e.g., distortion, brightness, thickness or the like) in the pattern image may be rarely caused at the fingertip. Also, without the user's touch on the surface with the finger, when the image recognizing unit 160 extracts the pattern image, the change in the pattern image may be caused due to the distance difference between the finger and the surface.

Figure 5:
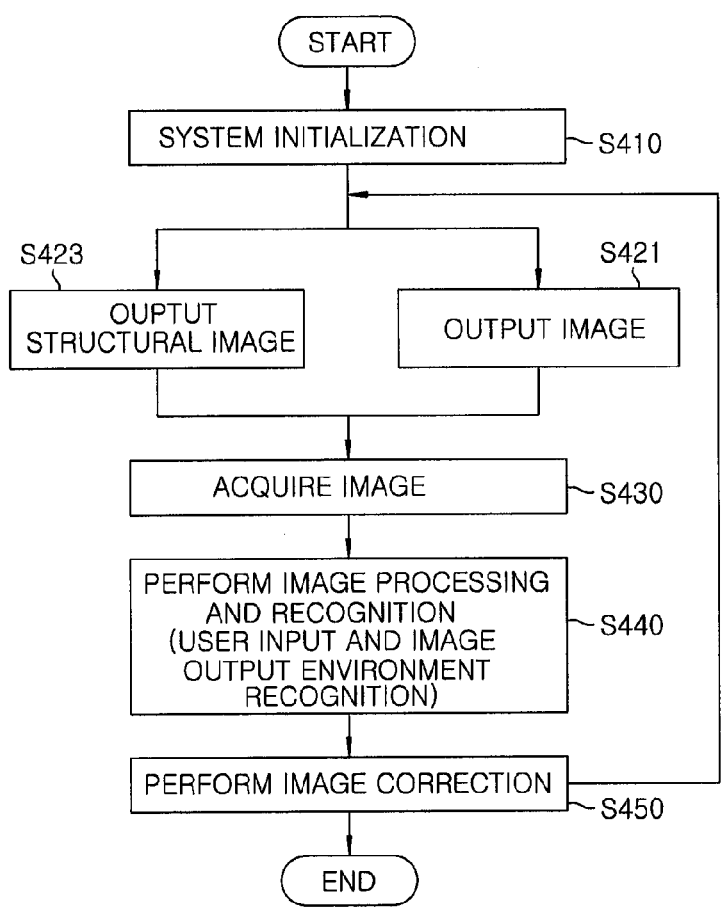
FIG. 5 is a flowchart illustrating a user interaction method using a pattern image in accordance with the embodiment of the present invention.

FIG. 5 is a flowchart illustrating a user interaction method using a pattern image in accordance with the embodiment of the present invention.

In the following, a description of the user interaction method by the user interaction apparatus will be given in an order of time in accordance with an embodiment of the present invention, with reference to FIGS. 1 and 5.

First, after a system initialization is performed in step S410, the image output unit 110 outputs a general RGB image on a display region in step S421.

When outputting such general image, the laser radiating unit 120 radiates laser beams for a pattern image; the pattern image forming unit 130 forms the pattern image by using the laser beams; and the pattern image output unit 140 outputs the pattern image by overlapping the same on the display region of the general image in step S423.

The image acquiring unit 150 acquires an image by capturing the general image and the pattern image. For example, when the pattern image output unit 140 outputs a pattern image frame at the preset regular intervals, the image acquiring unit 150 captures the pattern image frame at the same intervals in step S430.

Next, in step S440, the image recognizing unit 160 recognizes a user input by performing an image processing on the pattern image captured by the image acquiring unit 150, and additionally recognizes at least one or all of a focus state and a distortion state of the pattern image to provide the recognition results to the image correcting unit 170. By recognizing the user input, the image recognizing unit 160 may detect and trace the movement of a user's hand or fingertip. Then, the image correcting unit 170 corrects a focus status or a distortion status of an output image of the image output unit 110 based on the focus status, or the distortion status of the pattern image recognized by the image recognizing unit 160 in step S450.

In accordance with the embodiment of the present invention, a user interaction even with a bare-hand can be enabled and a low computation with respect to a captured image is required, whereby a short time is taken for an interaction processing, thus resulting in a fast response time.

Also, the use of the pattern image can result in exhibition of high recognition with respect to skin color and ambient light.

The foregoing present invention can be applicable not only to a projector system such as a projection computer or the like but also to a mobile device having an image output unit and an image acquiring unit. In particular, the present invention can be much useful in a mobile device or a wearable system with severe changes in environments such as ambient light intensity, lighting, fluctuation or the like, a small embedded system or the like requiring a low computation technique.

While the invention has been shown and described with respect to the particular embodiments, it will be understood by those skilled in the art that various changes and modification may be made without departing from the scope of the invention as defined in the following claims.

What is claimed is:

1. A user interaction apparatus using a pattern image comprising:
    an image output unit for outputting a general image on a display region;
    a laser radiating unit for radiating laser beams for a pattern image;
    a pattern image forming unit for forming the pattern image by using the laser beams;
    a pattern image output unit for outputting the pattern image by overlapping the same on the display region of the general image;
    an image acquiring unit for capturing the pattern image output on the display region; and
    an image recognizing unit for recognizing a user input by performing an image processing on the pattern image captured by the image acquiring unit.

2. The apparatus of claim 1, wherein the image recognizing unit recognizes at least one of a focus status and a distortion status of the general image through the image processing, and
    wherein the user interaction apparatus further includes an image correcting unit for correcting at least one of a focus status and a distortion status with respect to an output image outputted from the image output unit based on the status recognized by the image recognizing unit.

3. The apparatus of claim 1, wherein the image recognizing unit recognizes changes of distortion, brightness and thickness in the pattern image to detect and trace a movement of a user's hand or fingertip.

4. The apparatus of claim 1, wherein the laser radiating unit radiates infrared laser beams for the pattern image.

5. The apparatus of claim 1, wherein the pattern image forming unit includes diffraction gratings for forming specific patterns by diffracting the laser beams.

6. The apparatus of claim 4, wherein the specific patterns have a form of grid, lines or dots.

7. The apparatus of claim 1, wherein the pattern image output unit inserts a frame of the pattern image between general image frames at preset regular intervals, and
wherein the image acquiring unit captures the pattern image frame at the preset regular intervals.

8. A user interaction method using a pattern image comprising:
outputting a pattern image formed by using laser beams by overlapping the same on a display region of a general image;
capturing the pattern image output on the display region; and
recognizing a user input by performing an image processing on the captured pattern image.

9. The method of claim 8, wherein, in said recognizing a user input, at least one of a focus status and a distortion status of the general image is recognized through the image processing, and
wherein the method further includes correcting at least one of a focus status and a distortion status with respect to an outputted general image on the recognized status.

10. The method of claim 8, wherein, in said recognizing the user input, changes of distortion, brightness and thickness in the pattern image are recognized to detect and trace a movement of a user's hand or fingertip.

11. The method of claim 8, wherein, in said outputting a pattern image, the pattern image is formed by using infrared laser beams.

12. The method of claim 8, wherein, in said outputting a pattern image, the pattern image is formed by diffracting the laser beams.

13. The method of claim 12, wherein, in said outputting a pattern image, the pattern image is formed in a form of a grid, lines or dots.

14. The method of claim 8, wherein, in said outputting a pattern image, a frame of the pattern image is inserted between general image frames at preset regular intervals, and
wherein said capturing the pattern image captures the pattern image frame at the preset regular intervals.

\* \* \* \* \*